US005625421A

United States Patent [19]

Faroudja et al.

[11] Patent Number: 5,625,421
[45] Date of Patent: Apr. 29, 1997

[54] SUPPRESSION OF SAWTOOTH ARTIFACTS IN AN INTERLACE-TO-PROGRESSIVE CONVERTED SIGNAL

[75] Inventors: Yves C. Faroudja, 26595 Anacapa Dr., Los Altos Hills, Calif. 94022; Peter D. Swartz, San Rafael, Calif.

[73] Assignee: Yves C. Faroudja, Los Altos Hills, Calif.

[21] Appl. No.: 181,565

[22] Filed: Jan. 14, 1994

[51] Int. Cl.$^6$ ........................... H04N 5/21
[52] U.S. Cl. ................ 348/607; 348/619; 348/452; 348/448; 348/911
[58] Field of Search ............... 348/452, 451, 348/449, 448, 447, 606, 620, 619, 628, 911, 618, 607, 615, 624, 629, 623, 622, 701, 700; 345/127, 132, 136, 138; H04N 5/21, 5/213, 7/01

[56] References Cited

U.S. PATENT DOCUMENTS

| 4,398,210 | 8/1983 | Liu et al. ................ 348/607 |
| 4,485,403 | 11/1984 | Illetschko ................ 348/620 |
| 4,783,840 | 11/1988 | Song ................ 348/607 |
| 4,843,380 | 6/1989 | Oakley et al. ................ 340/723 |
| 4,967,263 | 10/1990 | Dieterich ................ 348/628 |
| 4,967,271 | 10/1990 | Campbell et al. ................ 358/105 |
| 4,982,280 | 1/1991 | Lyon et al. ................ 358/105 |
| 4,989,090 | 1/1991 | Campbell et al. ................ 358/140 |
| 5,025,312 | 6/1991 | Faroudja ................ 348/620 |
| 5,031,042 | 7/1991 | Rabii ................ 348/623 |
| 5,049,993 | 9/1991 | LeGall et al. ................ 348/448 |
| 5,128,747 | 7/1992 | Isnardi et al. ................ 358/12 |
| 5,136,385 | 8/1992 | Campbell ................ 348/607 |
| 5,159,451 | 10/1992 | Faroudja et al. ................ 358/140 |
| 5,260,775 | 11/1993 | Faroudja ................ 348/619 |
| 5,291,280 | 3/1994 | Faroudja et al. ................ 348/416 |
| 5,400,082 | 3/1995 | Kamiya ................ 348/619 |

FOREIGN PATENT DOCUMENTS

| 0471959 | 2/1992 | European Pat. Off. ......... H04N 5/44 |
| 0474287 | 3/1992 | European Pat. Off. ......... H04N 5/44 |
| 0551036 | 7/1993 | European Pat. Off. ......... H04N 5/44 |

*Primary Examiner*—John K. Peng
*Assistant Examiner*—Nathan J. Flynn
*Attorney, Agent, or Firm*—Thomas A. Gallagher

[57] ABSTRACT

Jagged vertical or diagonal transition artifacts in interlaced to line doubled progressive scan converted television signals are detected and areas of the television picture having such artifacts are subjected to vertical averaging such that the resolution of the jagged transitions is reduced, thereby softening, "greying" or "fuzzing" the jagged transitions and causing them to appear smooth. Thus, highly contrasted lines appearing in a sawtooth pattern, which are extremely perceptible, are replaced with a flash of what might be characterized as "fuzziness," which is not perceptible. The eye no longer perceives the jagged artifacts. Moreover, areas of reduced vertical and horizontal resolution, resulting from the vertical averaging, do not create any new artifacts and are not perceived by the eye. Artifacts are detected by comparing pixels in corresponding positions in the scan lines of the line doubled progressively scanned television signal. The detection scheme looks for sawtooth patterns by determining if there are differences among pixels in more than one set of three adjacent lines. When a sawtooth pattern is detected, the uncorrected signal in the sawtooth region of a scan line is faded to a vertically filtered or averaged signal just prior to the onset of the sawtooth artifact region and then faded back to the uncorrected signal just subsequent to the sawtooth artifact region. The sawtooth correction signal, which controls fading to and from a filtered video signal, is expanded in all directions horizontally and vertically somewhat beyond the region of the detected artifact in order to insure that all of the artifact is suppressed.

21 Claims, 11 Drawing Sheets

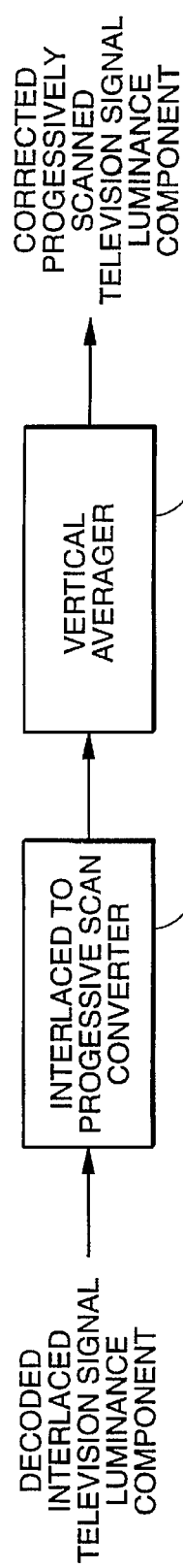
FIG._1
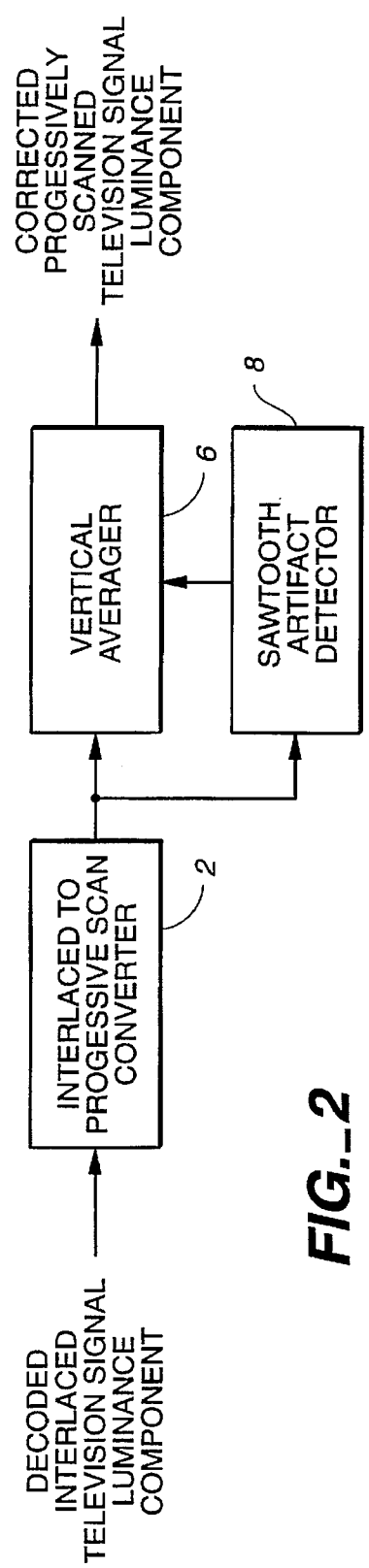
FIG._2
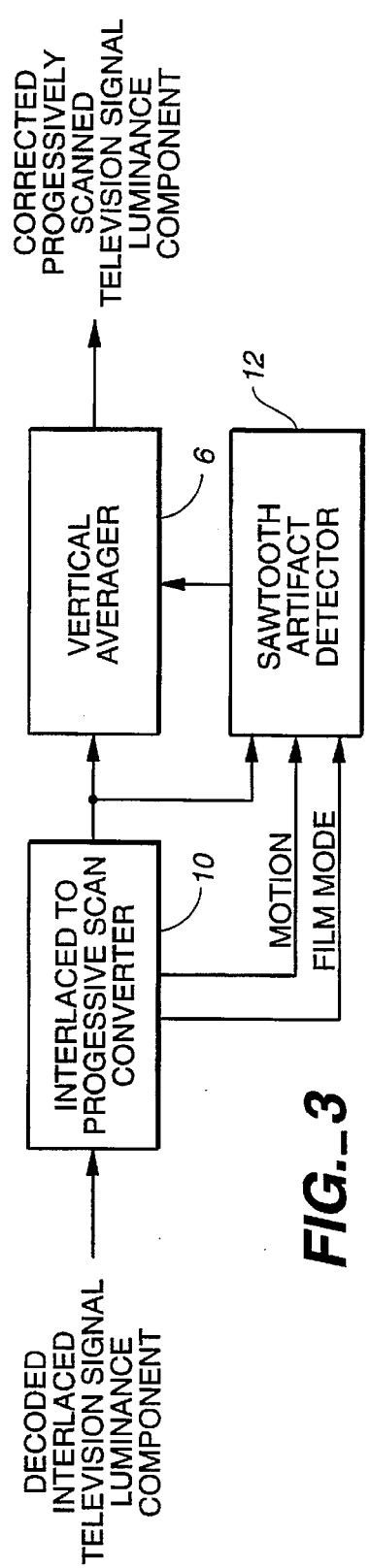
FIG._3

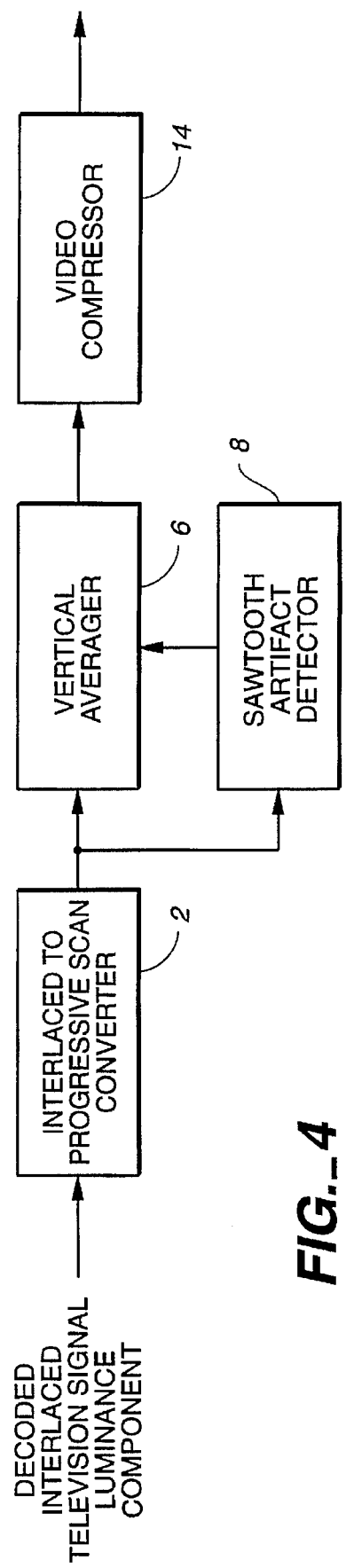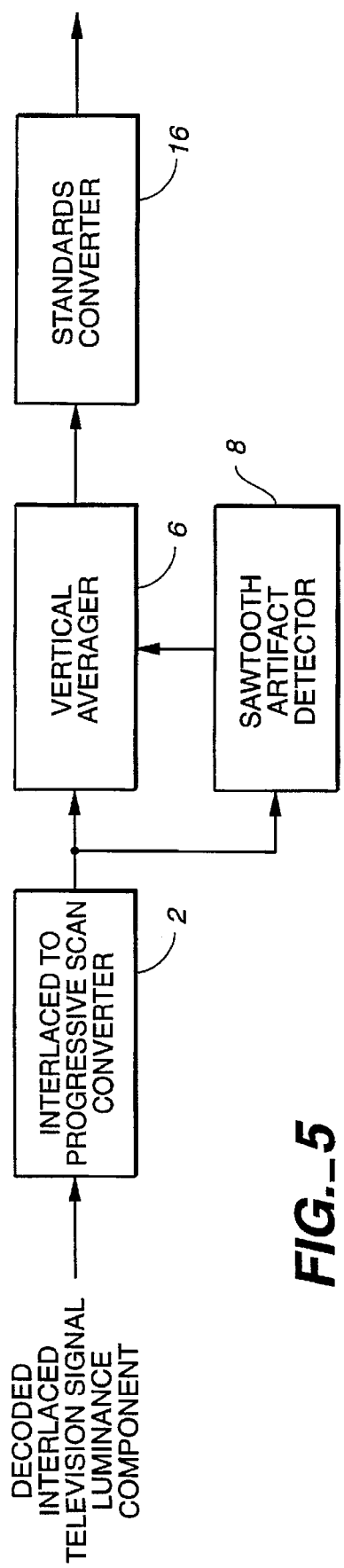

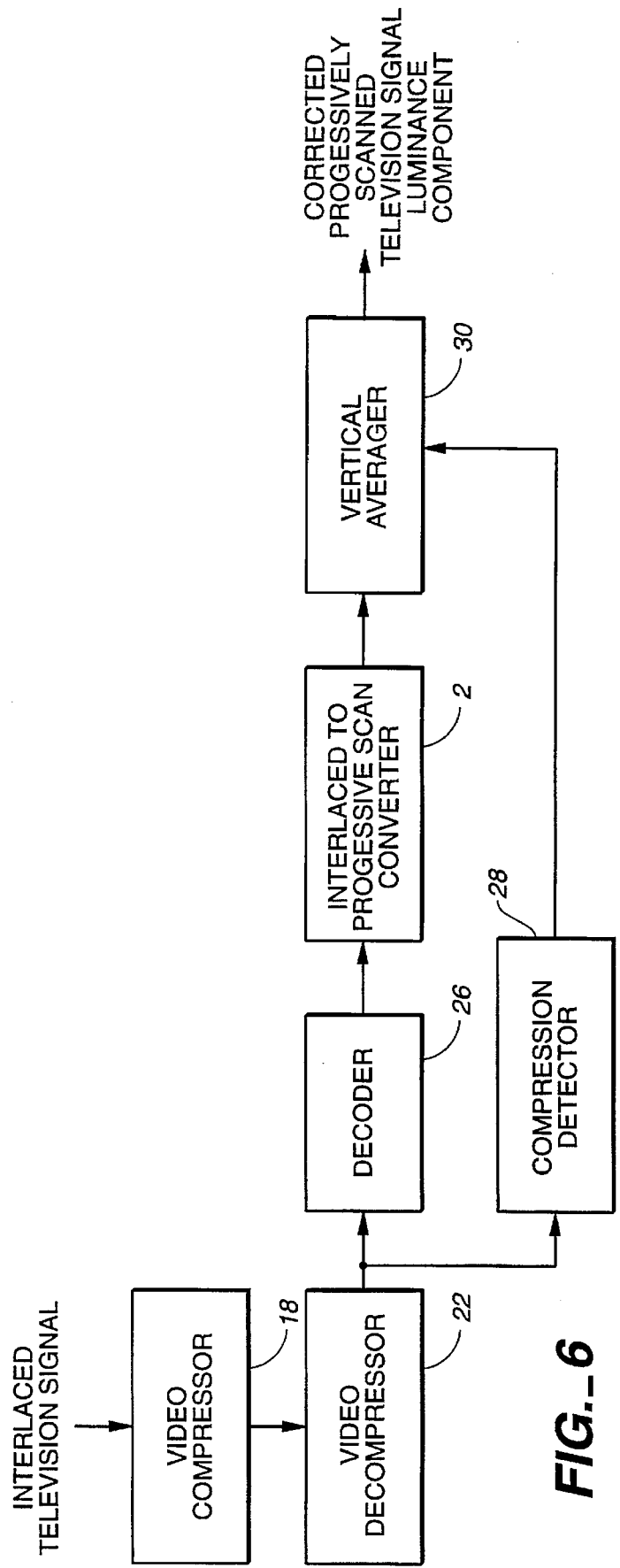
FIG._6

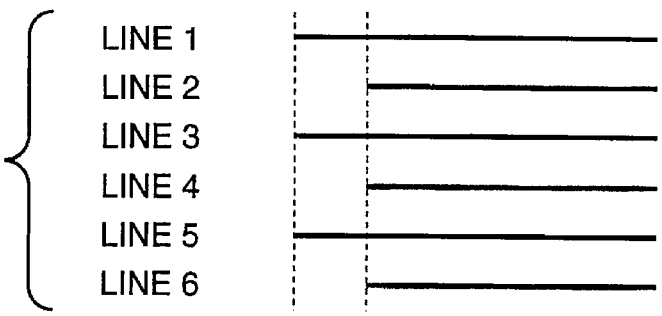
FIG._7A
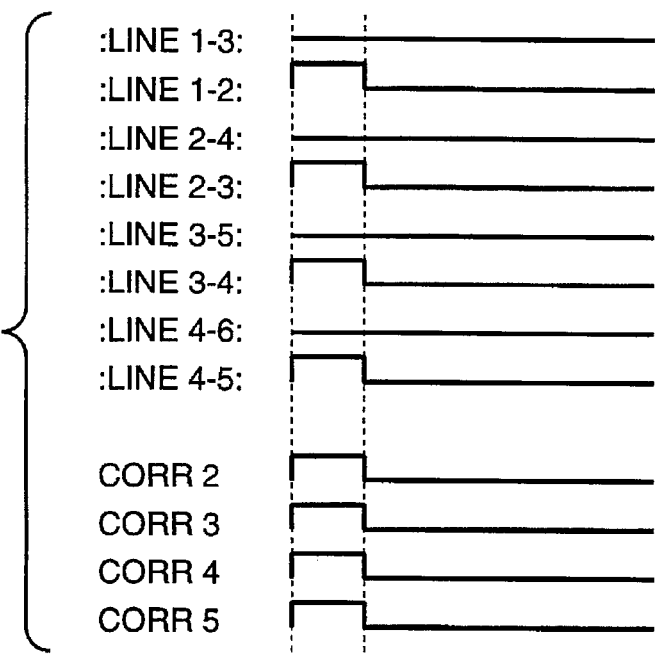
FIG._7B
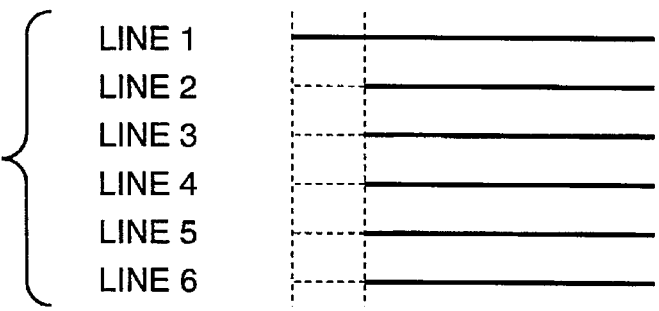
FIG._7C

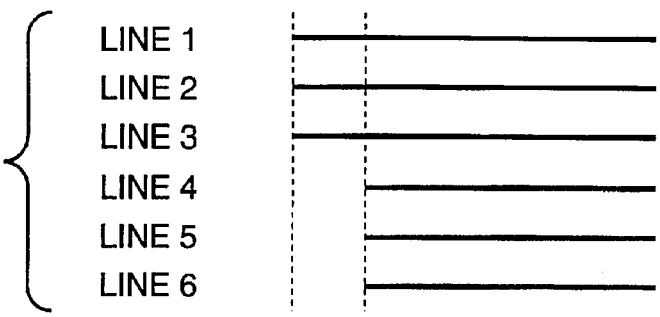
FIG._8A
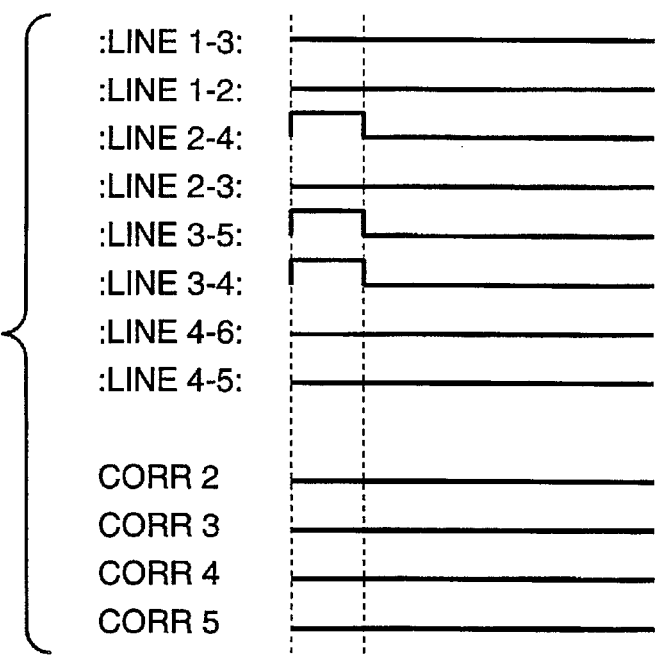
FIG._8B
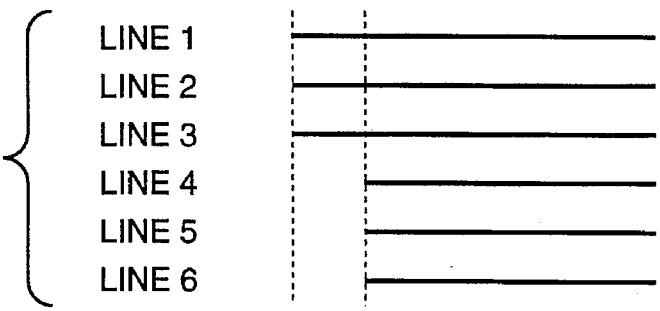
FIG._8C

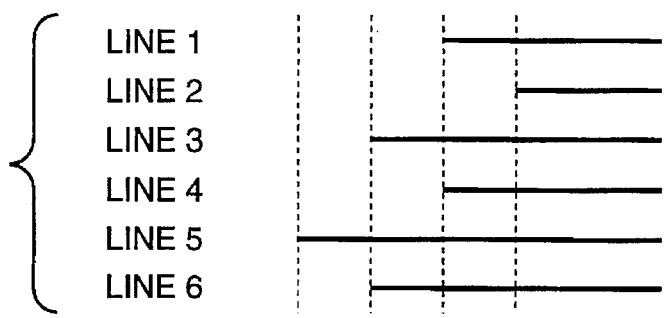
FIG._9A
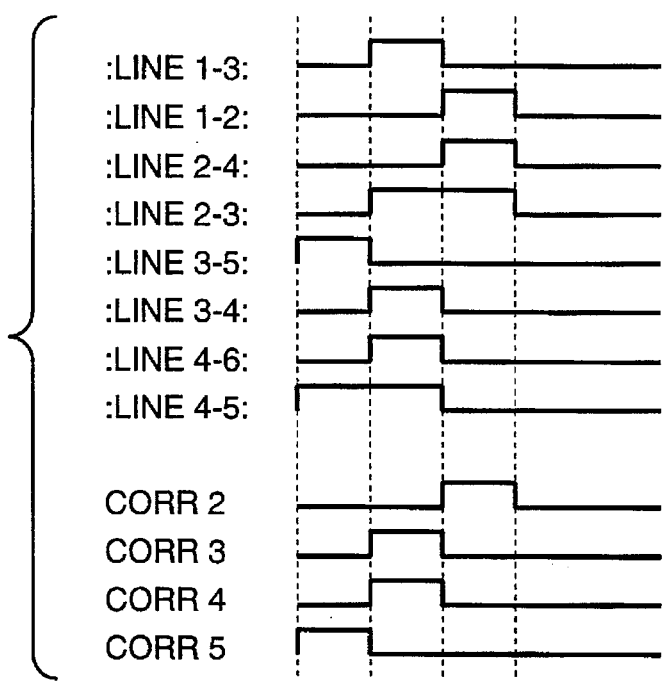
FIG._9B
FIG._9C

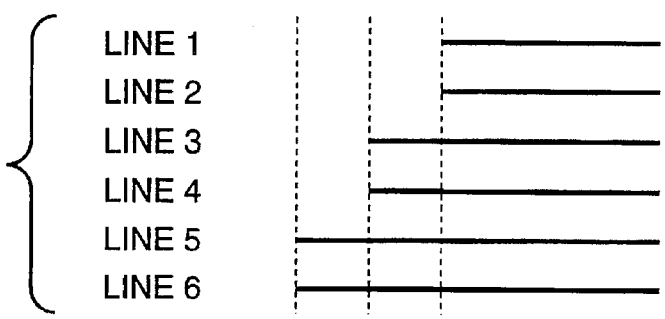
FIG._10A
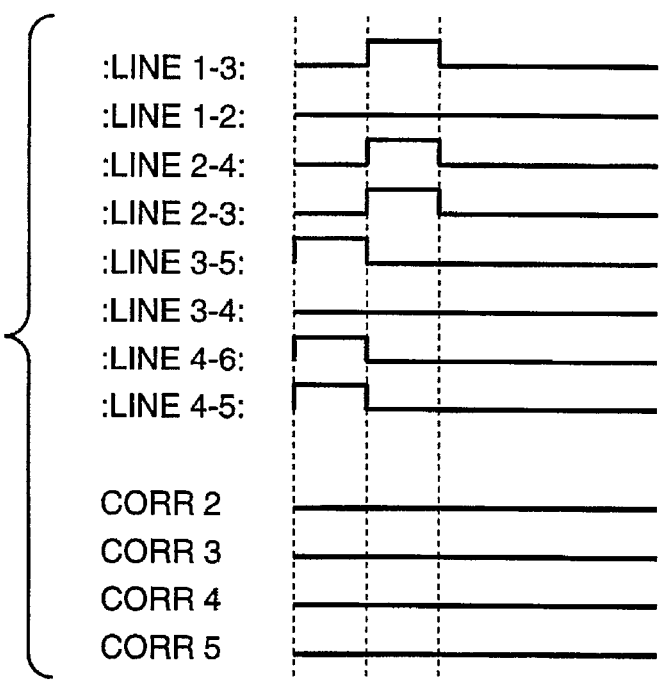
FIG._10B
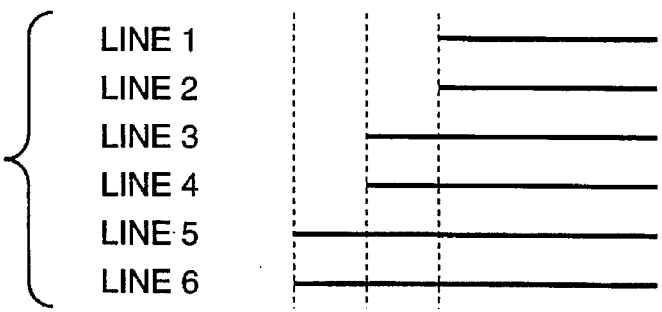
FIG._10C

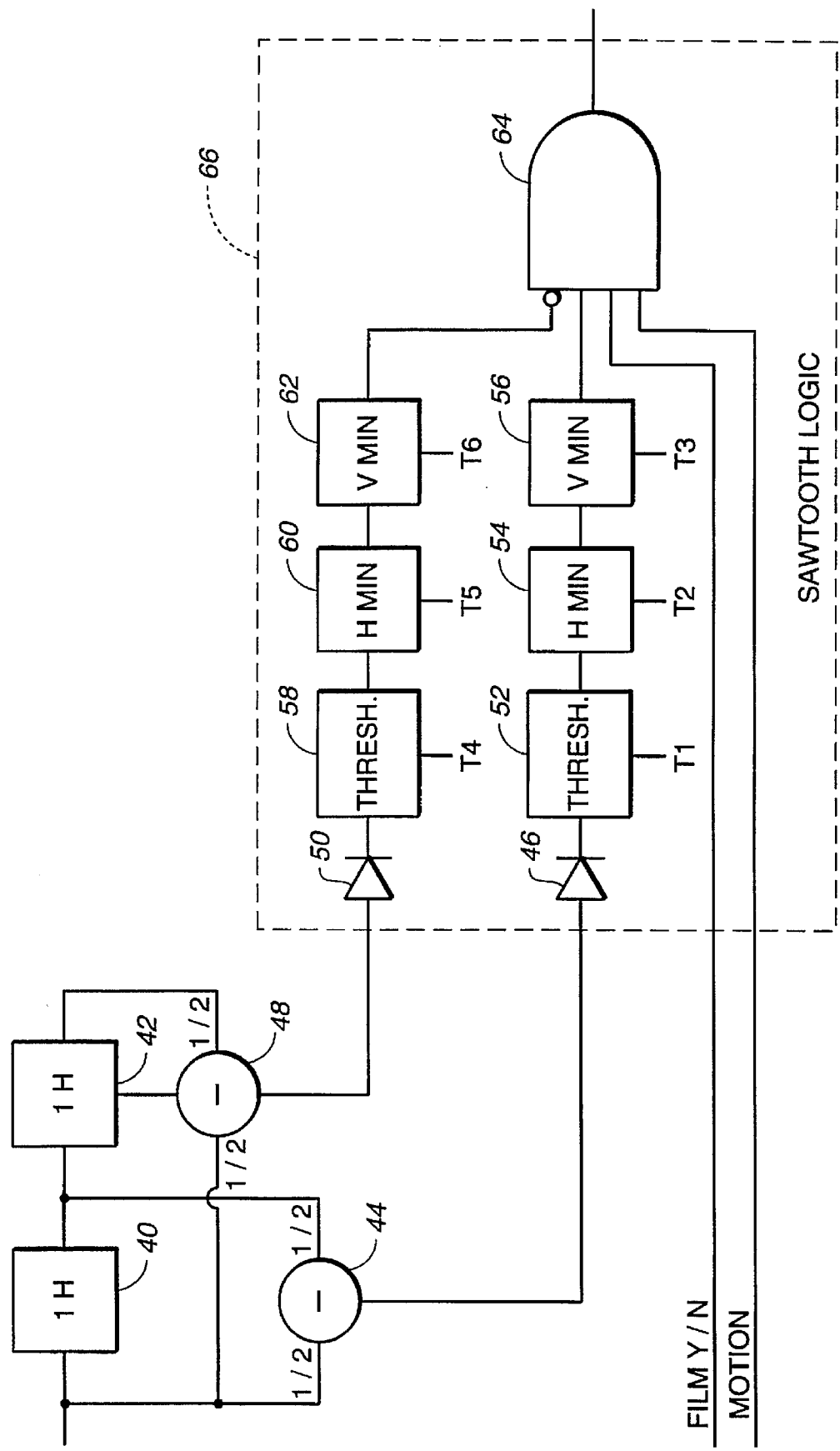
FIG._11

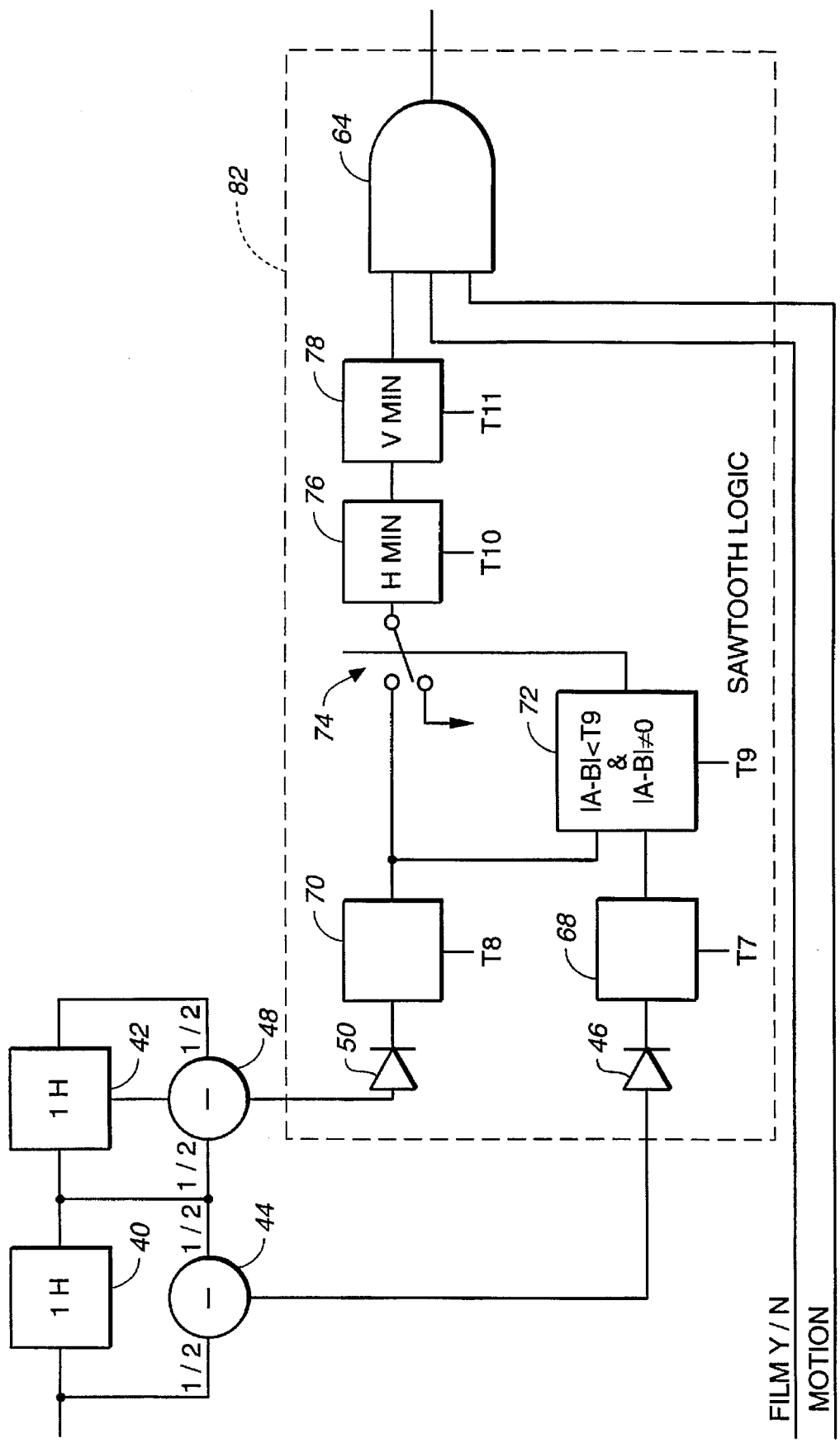
FIG._12

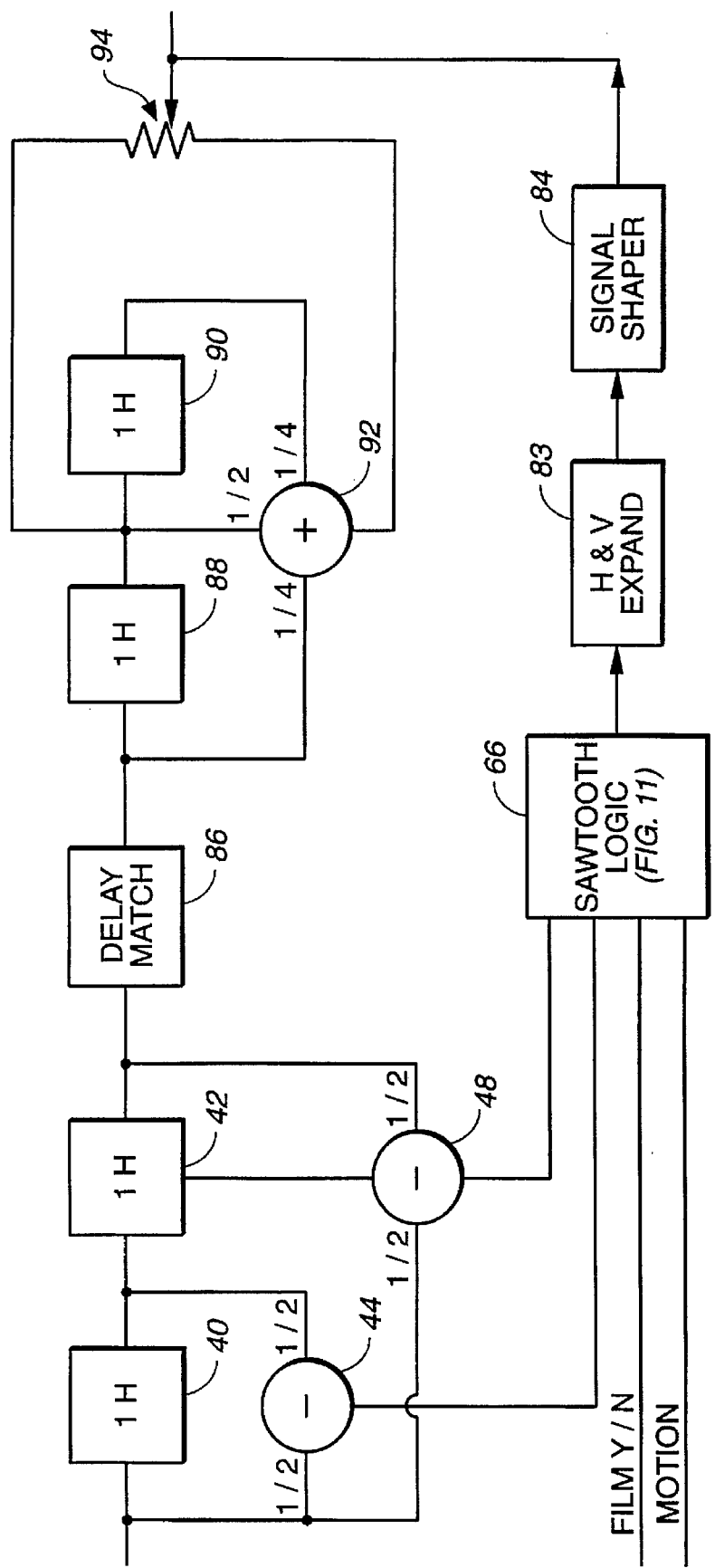
FIG._13

SUPPRESSION OF SAWTOOTH ARTIFACTS IN AN INTERLACE-TO-PROGRESSIVE CONVERTED SIGNAL

FIELD OF THE INVENTION

This present invention relates to television signal processing methods and apparatus. More particularly, the invention relates to removing artifacts occurring in the reproduced display of a progressively scanned television signal which has been converted from an interlaced television signal. Such artifacts appear briefly and intermittently as jagged vertical or diagonal transitions along the edges of objects moving horizontally or diagonally in the television picture. Such ragged transition artifacts may also be described as a fragmented reproduction of vertical and diagonal lines and are also known as a "sawtooth" or a "venetian blind" effect. The luminanee component of the artifact appears as alternating black and white lines.

BACKGROUND OF THE INVENTION

A well-known "line-doubling" technique employs the conversion of an interlaced television signal (such as employed in the NTSC, PAL and SECAM systems), in which two time consecutive interleaved fields of scan lines represent a frame, to a non-interlaced or progressively scanned television signal, in which all of the scan lines in the frame are scanned out sequentially. The result, in the case of NTSC, is that 525 scan lines are presented every one-sixtieth of a second rather than 262.5 scan lines, thus potentially doubling the vertical resolution to the full frame resolution of 525 lines. Typically, line doublers employ, at least part of the time, field merging or inter-field interpolation, which provides a full doubling of the vertical resolution. Pairs of fields are combined to form a single progressively scanned frame. Such arrangements are described in U.S. Pat. Nos. 4,876,596; 4,967,271; 4,982,280; 4,989,090 and 5,159,451, each of which hereby is incorporated by reference in its entirety. Such an arrangement is also described in allowed U.S. Pat. No. 5,291,280, which is hereby incorporated by reference in its entirety.

One problem resulting from field merging is that there is a time difference between fields in the interlaced television signal. Thus, a moving object may be in different locations from field to field and, if two such fields are combined to form a single frame, the vertical and diagonal edges of objects moving horizontally or diagonally appear as ragged sawtooths rather than smooth curves. Line doubling is lost along such transitions. The sawtooth effect is exacerbated if the reproduction system employs vertical enhancement.

One solution to this problem is to employ some type of scan line or intra-field interpolation in regions of the television picture display in which movement is occurring. An improved technique for providing intra-field interpolation in areas of the picture having motion is set forth in said U.S. Pat. No. 4,989,090.

A potential problem with switchable inter-field/intra-field interpolation line doublers is that motion may not be properly detected at all times, thus allowing the above mentioned jagged vertical or diagonal transition artifacts to appear briefly and intermittently. Such arrangements may have particular difficulty in consistently switching correctly between operating regimes when operating on an interlaced television signal that has been subject to data compression or standards conversion (as from PAL to NTSC, for example).

Another known solution to the problem is to recognize when the source of the interlaced television signal is a motion picture film. In the United States, 24 frame per second motion picture films are applied to the 30 frame per second NTSC television signal by means of a "3-2 pulldown ratio," such that a patterned sequence of 3 film frames, 2 film frames, 3 film frames, etc. are carded by consecutive television fields. By identifying pairs of interlaced fields carrying the same film frame, the pairs may be merged to generate essentially perfect line doubled progressively scanned frames, each representing a motion picture frame. Such techniques are described in said U.S. Pat. No. 4,876,596 and 4,982,280.

However, the motion picture film detection arrangement is also subject to problems. For example, a video edit (rather than a film edit) may disrupt the 3-2 pulldown ratio, causing merged television fields to be derived from different film frames. Thus, until the film pulldown ratio detection circuitry resynchronizes itself (typically one to four fields of the input interlaced television signal), the ragged sawtooth transition artifacts, described above, may appear at the edges of moving objects. Although the undesired effect is fleeting, it is perceptible to the eye, occasionally disturbing an otherwise near perfect line doubling arrangement.

The last discussed problem may also arise in the motion picture film source line doubling arrangement when the input interlaced television signal fades from a film source to a video source. In that case, the system, as described, for example, in said U.S. Pat. No. 4,982,280, continues to operate in its "film mode" for a few fields before recognizing the loss of the 3-2 pull down pattern and switching to an inter field/intra-field interpolation arrangement of the sort described above. During those few fields before changeover from the film mode of operation, the same sort of ragged sawtooth artifacts may be generated if there is motion between the fields. In addition, the problem may also arise when the interlaced television signal derived from a motion picture source has been imperfectly data compressed or standards converted.

One solution to the problem of video edits disrupting the 3-2 pulldown ratio is set forth in said allowed U.S. Pat. No. 5,291,280, of applicant Yves C. Faroudja. The solution requires the use of a field delay and relatively complex circuitry in order to "look ahead" for video edits. Such a solution adds a further one field delay to the four field delay which is typically employed in line doubling progressive scan converters, resulting in a perceptible delay between the picture and undelayed audio. Thus, such an arrangement requires the use of a high quality audio delay, adding further cost and complexity.

SUMMARY OF THE INVENTION

In accordance with the teachings of the present invention, jagged vertical or diagonal transition artifacts in interlaced to line doubled progressive scan converted television signals are detected and areas of the television picture having such artifacts are subjected to vertical averaging such that the resolution of the jagged transitions is reduced, thereby softening, "greying" or "fuzzing" the jagged transitions and causing them to appear smooth. The result is that the eye no longer perceives the artifacts. Moreover, the areas of reduced vertical and horizontal resolution, resulting from the vertical averaging, do not create any new artifacts and are not perceived by the eye. The correction is very benign.

The corrected areas of reduced resolution occur briefly, typically for no more than 5 or 6 fields, and occur randomly throughout the reproduced picture. Applicants have found that the perception of high resolution throughout the reproduced picture is not lessened by the occurrence of these limited area, brief and randomly located areas of reduced resolution. In effect, the invention replaces a flash of highly contrasted lines appearing in a sawtooth pattern, which is extremely perceptible, with a flash of what might be characterized as "fuzziness," which is not perceptible. In the rare situation when an artificially generated (such as by computer) scene has highly contrasted lines exactly in phase with the scanning lines (which cannot otherwise occur due to the Nyquist criteria), although the pattern is removed and replaced by the impression of fuzziness, no artifacts are produced.

The artifacts are detected by arrangements which compare pixels in corresponding positions in the scan lines of the line doubled progressively scanned television signal. Simply stated, the detection scheme looks for sawtooth patterns by determining if there are differences among pixels in more than one set of three adjacent lines. For example, when for two or more consecutive occurrences the difference between pixels in two adjacent lines is high and the difference between pixels in lines separated by one line is small, it is considered a sawtooth pattern.

When a sawtooth pattern is detected, the uncorrected signal in the sawtooth region of a scan line preferably is faded to a vertically filtered or averaged signal just prior to the onset of the sawtooth artifact region and then faded back to the uncorrected signal just subsequent to the sawtooth artifact region. Detection of a sawtooth pattern is subject to thresholds in order to avoid noise induced corrections and to insure that the sawtooth pattern has an amplitude and size that results in a perceptible artifact and should be corrected.

The sawtooth correction signal, which controls fading to and from a filtered video signal, preferably is expanded in all directions horizontally and vertically somewhat beyond the region of the detected artifact in order to insure that all of the artifact is suppressed. Horizontal expansion is required in order to assure that all areas of the sawtooth region are detected when the angle of a diagonal transition approaches zero degrees. Vertical expansion is required to assure that the first and last line of the sawtooth region are detected.

In addition, the motion detection signal is also expanded in all directions horizontally and vertically in order to insure that all of the artifact is suppressed. Under certain circumstances, the motion detection signal also must be extended temporally by one field. When the interlaced television signal is an NTSC signal and if the source for that NTSC signal is film, and when correction is provided only when a sawtooth artifact and motion are detected, the motion detection signal must be extended one field because no motion is detected every fifth field due to the 3-2 pulldown ratio. Thus, unless the motion signal is extended by one field so that it covers the motionless fifth field, every fifth field (a 12 Hz repetition rate) will contain the uncorrected sawtooth artifact, which is highly visible. Alternatively, the sawtooth correction signal may be temporally extended by one field.

The vertically averaged signal which is substituted for the uncorrected signal must be aligned with the non-averaged uncorrected signal in the horizontal, vertical and temporal dimensions, particularly the vertical dimension. Consequently, three or more odd number of lines must be averaged. If, for example, only two lines are averaged, the vertically averaged pixels will be delayed by half a line with respect to the non-averaged pixels. In a preferred embodiment, a five-pole vertical averager is used because it provides a good compromise between performance and cost. A five-pole vertical averager has a rise time which is slightly more than one scanning line in the vertical domain along with acceptable pre-shoot, overshoot and ringing characteristics. A less expensive three-pole vertical filter is also usable, although it has a rise time of about three scanning lines in the vertical domain. In principle, higher order filters may be used (e.g., 7-pole, 9-pole, etc.) with ever improving performance but at greater and greater cost.

A preferred environment for the present invention is in connection with a film mode detecting line doubler of the type described in said U.S. Pat. No. 4,982,280. In that environment, the vertical averaging corrector preferably would substitute a vertically averaged signal only in response to the detection of a sawtooth region in combination with the line doubler operating in its film mode and the detection of motion in the picture. This restricted operation assumes that sawtooth type artifacts arise in a system according to said '280 patent only in the film mode and not when the line doubler is operating on a non-film source as an inter-field/intra-field line doubling progressive scan converter. The invention, however, is not limited to the environment just described. As discussed above, the undesirable sawtooth artifacts may arise under other conditions and in other line doubling progress scan converter environments. For example, the motion detection arrangement may be inadequate to detect all motion which results in perceptible sawtooth artifacts in a non-film source inter-field/intra-field line doubling progressive scan converter. Particularly, it may be desirable to purposely design such a system with a simple, low cost, relatively poorly performing motion detection circuit with the intention that perceptible artifacts may be corrected using the vertical averaging arrangement according to the present invention. The invention may be advantageously employed in connection with an interlace to line doubled progressive scan converter which precedes a video data compressor or a standards converter. Both video compression and standards conversion are more accurately and easily accomplished when operating on a progressively scanned television signal rather than an interlaced television signal. By employing the present invention in a progressive scan converter preceding such video compression or standards conversion, such processes are assured to be operating on a more optimum signal source.

As mentioned above, the undesirable sawtooth artifacts may result in part because the input interlaced television signal is a signal that has been subjected to video compression and decompression. The decoded compressed signal may contain errors that result in the frequent generation of sawtooth artifacts in the line doubled progressive scan converted signal. These artifacts may be small and located in motionless areas of the television picture. Thus, when the interlaced television input signal has been subjected to compression, it may be desirable to continuously provide vertical averaging throughout the entire reproduced picture and accept the resulting loss of picture resolution. If compressed television signals carry an identifier, such as an identification bit, the vertical averaging arrangement may be configured to automatically provide continuous vertical averaging when the identifier is detected.

The signal processing according to the present invention is applied to components of the television signal. Thus, for example, the interlaced television signal is decoded into components. For simplicity in describing the invention, the description of the preferred embodiments will refer to processing of the luminance component of the decoded television signal. If the chrominance signal components are line averaged, such as in the line doubling configurations in the relevant U.S. Patents cited above, it is not necessary to process them other than by providing an appropriate delay so that they remain time coherent with the processed luminance. If the chrominance signal components are not subject to line averaging during line doubling, then the chroma should be processed in the same manner as the luminance signal components in accordance with the various aspects of this invention.

Thus, according to a first aspect of the invention, artifacts are detected in the luminance component of a progressively scanned video signal that has been converted from a decoded interlaced television signal, wherein the artifacts are in the form of jagged vertical or diagonal transitions along the edges of objects moving in the progressively scanned video signal, and vertically averaging the luminance component of the progressively scanned video signal in the region or regions in which the artifacts are detected.

According to another aspect of the invention, the luminance component of a decoded interlaced television signal is convened to a progressively scanned video signal, wherein said progressively scanned video signal exhibits artifacts in the form of jagged vertical or diagonal transitions along the edges of objects moving in the progressively scanned video signal, and the progressively scanned video signal is vertically averaged at least in the region or regions in which the artifacts are present.

BRIEF DESCRIPTION OF THE DRAWINGS

FIG. 1 is a functional block diagram showing a basic embodiment of the present invention.

FIG. 2 is a functional block diagram showing an alternative basic embodiment of the present invention.

FIG. 3 is a functional block diagram showing yet a further alternative basic embodiment of the present invention.

FIG. 4 is a functional block diagram showing an embodiment of the invention in a video compression environment.

FIG. 5 is a functional block diagram showing an embodiment of the invention in a television standards conversion environment.

FIG. 6 shows a functional block diagram of an embodiment of the invention in the environment of an interlaced to progressive scan converter receiving an interlaced television signal that has been subject to video compression.

FIG. 7A is a diagrammatic view of an idealized displayed television signal in the region of a vertical sawtooth artifact.

FIG. 7B is a diagrammatic view useful in understanding the manner in which the vertical sawtooth artifact of FIG. 7A is corrected.

FIG. 7C is a diagrammatic view of an idealized displayed television signal showing the effect of the correction in the region in which the vertical sawtooth artifact was present.

FIG. 8A is a diagrammatic view of an idealized displayed television signal in the region of a normal horizontal offset transition.

FIG. 8B is a diagrammatic view useful in understanding the manner in which the horizontal offset transition of FIG. 8A is not altered by the techniques of the invention.

FIG. 8C is a diagrammatic view of an idealized displayed television signal showing that the region in which the horizontal offset transition is present is not altered.

FIG. 9A is a diagrammatic view of an idealized displayed television signal in the region of a diagonal sawtooth artifact.

FIG. 9B is a diagrammatic view useful in understanding the manner in which the diagonal sawtooth artifact of FIG. 9A is corrected.

FIG. 9C is a diagrammatic view of an idealized displayed television signal showing the effect of the correction in the region in which the diagonal sawtooth artifact was present.

FIG. 10A is a diagrammatic view of an idealized displayed television signal in the region of a normal diagonal transition. FIG. 10B is a diagrammatic view useful in understanding the manner in which the horizontal transition of FIG. 10A is not altered by the techniques of the invention.

FIG. 10C is a diagrammatic view of an idealized displayed television signal showing that the region in which the diagonal offset transition is present is not altered.

FIG. 11 is a functional block diagram is a preferred embodiment of the sawtooth detector 12 of FIG. 3.

FIG. 12 is a functional block diagram of an alternate embodiment of the sawtooth detector 12 of FIG. 3.

FIG. 13 is a functional block diagram showing the control circuit functions and the video path functions, namely the one-line delay and sawtooth arrangement of FIG. 11 in combination with a 3-pole filter for vertical averaging.

DESCRIPTION OF THE PREFERRED EMBODIMENTS

Figure 14:
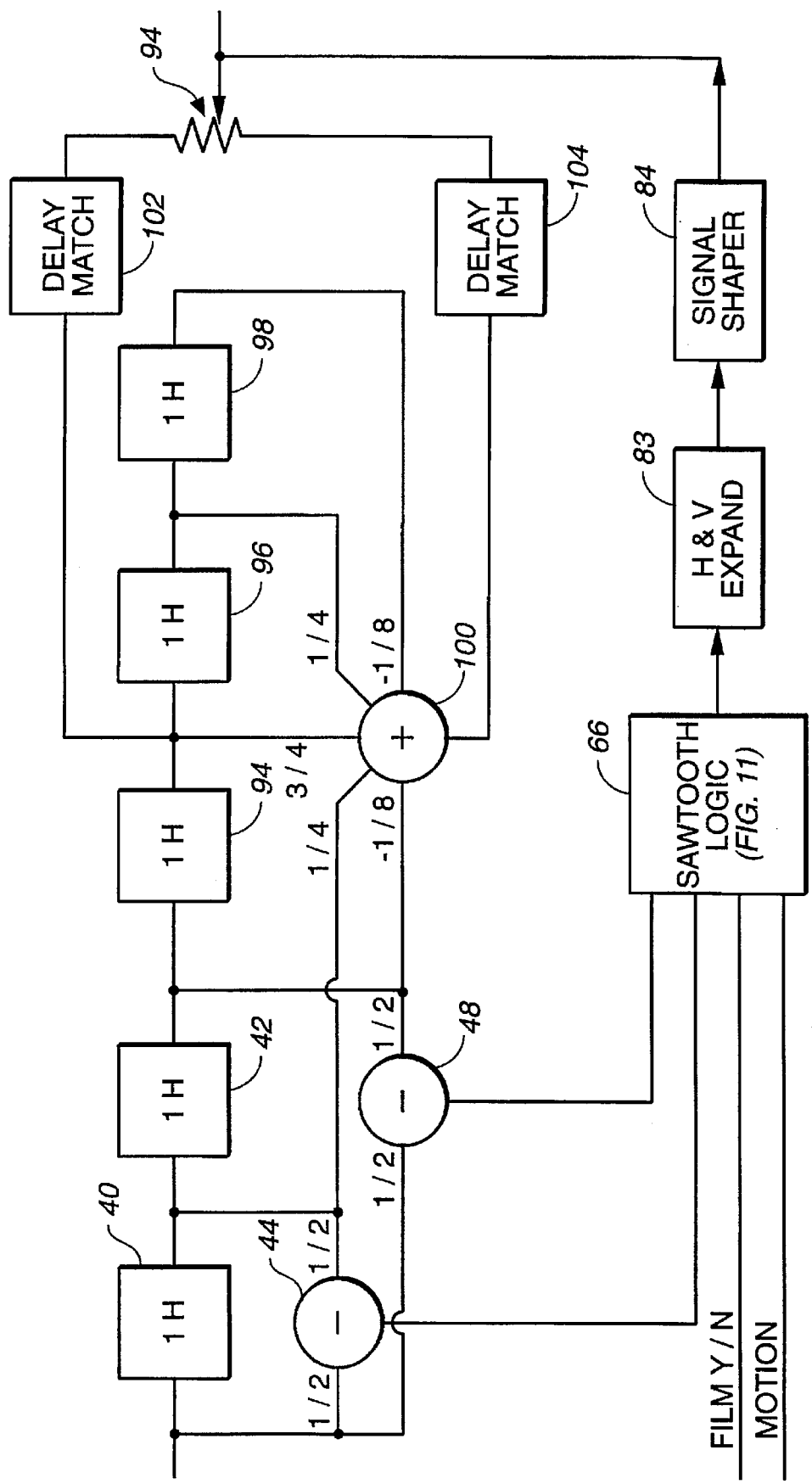
FIG. 14 is a functional block diagram of a five-pole vertical averager alternative to the embodiment of FIG. 13.

A basic functional arrangement embodying the present invention is shown in FIG. 1, wherein the luminance component of a decoded interlaced television signal (such as an NTSC, PAL or SECAM signal) is applied to an interlace to progressive scan converter 2. The output of converter 2 is applied to a vertical averager 4. The output of averager 4 is the corrected progressively scanned luminance television signal component in which sawtooth type artifacts are suppressed. Converter 2 constitutes a line doubler and employs, at least part of the time, the field merging or inter-field interpolation technique to combine pairs of interlaced fields to form progressively scanned frames. Converter 2 may also have other modes of interpolation, as described above and in the cited prior patents. As explained above, converters or line doublers such as converter 2 are susceptible to the generation of undesirable "sawtooth" artifacts. In order to suppress such artifacts, vertical averager 4 averages the output of converter 2 over three or more odd number of horizontal scan lines to provide a corrected line doubled progressively scanned television signal luminance component output. In a preferred embodiment, a five-pole vertical averager is used, although a three-pole vertical filter is also usable. The vertical averaging may be continuous. Continuous vertical averaging of the luminance component over the entire picture will result in some loss of horizontal and vertical resolution. However, this may be an acceptable tradeoff in order to simplify the correction system and lower its cost.

A preferred arrangement, shown in the functional block diagram of FIG. 2, is to detect the occurrence of a sawtooth artifact and to provide vertical averaging correction only so far as necessary to suppress the visible perception of the artifact. The output of converter 2 is applied to a vertical averager 6 and a sawtooth artifact detector 8. Averager 6 is the same as averager 4 except that it is switchable so as to provide vertical averaging only in response to a control signal supplied by detector 8. Preferably, the control signal provides a gradual switchover to and from the averaged signal. The sawtooth artifact detector 8 compares pixels at corresponding horizontal scanning line positions in adjacent triples of scan lines in order to detect sawtooth patterns and distinguish them from proper picture transition patterns.

Details of preferred sawtooth artifact detector functions are described below.

In a more specific preferred embodiment, shown in the functional block diagram of FIG. 3, an interlaced to progressive scan converter 10, of the type disclosed in said U.S. Pat. No. 4,982,280, provides not only a progressively scanned video output to vertical averager 6 and to a sawtooth artifact detector 12, but also motion and film mode signals, which are also applied to detector 12. In this arrangement, which is described in further detail below, detector 12 develops its control signal not only in response to sawtooth artifacts detected in the progressively scanned video signal output of converter 10 but also in response to the presence of a motion signal and a film mode signal from converter 10. In this embodiment, the detector 12 modifies the motion signal from converter 10, which is developed in converter 10 prior to line doubling, in order to line double the motion signal. This is also explained in further detail below.

FIG. 4 shows a functional block diagram of the invention in a video compression environment. As mentioned above, it is highly desirable to perform video compression on an artifact-free progressively scanned video signal rather than on an interlaced video signal. Thus, as shown in FIG. 4, the output of the arrangement such as shown in FIG. 2 is applied to a video compressor 14. Alternatively, the output of the arrangements of FIG. 1 or FIG. 3, respectively, may be applied to video compressor 14. The particular type of video compressor is not critical and may employ any suitable type of compression, including, for example, video compression according to MPEG or other standards.

FIG. 5 shows a functional block diagram of the invention in a television standards conversion environment. As mentioned above, it is highly desirable to perform television standards conversion on an artifact-free progressively scanned video signal rather than on an interlaced video signal. Thus, as shown in FIG. 5, the output of the arrangement such as shown in FIG. 2 is applied to a standards converter 14. Alternatively, the output of the arrangements of FIG. 1 or FIG. 3, respectively, may be applied to standards converter 14. The particular type of standards converter is not critical and may be of any desired type, including, for example, an NTSC to PAL or a PAL to NTSC standards converter.

FIG. 6 shows a functional block diagram of the invention in the environment of an interlaced to progressive scan converter receiving an interlaced television signal that has been subject to video compression. The particular type of video compressor is not critical and may employ any suitable type of compression, including, for example, video compression according to MPEG or other standards. An interlaced television signal is applied to a video compressor 18 and is carded by a transmission or storage channel 20 to a video decompressor or decompressor 22 which in turn feeds a transmission or storage channel 24. The interlaced television signal which has been subject to compression is applied to a decoder 26 and a compression detector 28. Decoder 26 decodes the television signal, which may be, for example, an NTSC television signal, into its components. The luminance component is applied to an interlace to progressive scan converter 2. Compression detector 28 detects that the signal from decompressor 22 has been subject to video compression. In a practical environment, the video compressor 18 and or video decompressor may be remotely located from the remaining elements of the system of FIG. 6. Thus, if automatic response is desired, the compression detector 28 is essential in determining if the received interlaced television signal has been subject to compression. In a proposed compression system, a special identifying signal or digital bit will identify when the television signal has been compressed. Detector 28 may, for example, be configured to detect such a special identifying signal. In response to detecting a television signal that has undergone compression, detector 28 turns on vertical averager 30 so that it operates continuously in the presence of such a signal. If the video decompressor is physically located with the converter 2 and averager 30, the detector 28 may be omitted and the averager 30 used continuously without the requirement of a detector 28 to turn the averager 30 on and off.

In accordance with the preferred embodiments of the invention, in detecting a sawtooth pattern, two pieces of information are required: (1) the difference between pixel amplitudes on the current scanning line and the amplitude of correspondingly located pixels in the scanning line displaced vertically by 2 lines, and (2) the difference between pixel amplitudes on the current line and the amplitude of correspondingly located pixels in the scanning line displaced vertically by 1 line. Subject to minimum occurrences and thresholds as explained further below, a sawtooth pattern is considered to occur upon either of the following two essentially equivalent conditions:

1. If |line n−line (n+2)|≈0 and |line n−line (n+1)|<>0, or 2. if |line n−line (n−1)|≈|line n−line (n+1)|<>0.

It is useful to examine how these criteria for sawtooth detection will operate on a few examples: a vertical sawtooth, an offset horizontal transition, a diagonal sawtooth and a diagonal transition.

FIGS. 7A, 7B and 7C relate to the example of an exactly vertical sawtooth. FIGS. 7A and 7C show diagrammatically the appearance of the displayed television signal in the region of interest, for the input signal and the output, respectively. In FIG. 7B each of the plurality of vertical axes is amplitude and each of the horizontal axes is position along the horizontal scanning lines of FIGS. 7A and 7C. "CORR 2," etc., refers to the correction to line 2 of the input video.

FIGS. 8A, 9A and 10A, described below also show diagrammatically the appearance of the displayed television signal in the region of interest for the input signal. FIGS. 8C, 9C and 10C, described below also show diagrammatically the appearance of the displayed television signal in the region of interest for the output signal. FIGS. 8B, 9B and 10B, described below, also show amplitude versus horizontal position along respective scanning lines. In the examples of FIGS. 7, 8, 9 and 10, the Figures are for the purpose of illustrating a principle and do not reflect that a minimum number of occurrences or that temporal, horizontal or vertical expansion are required to recognize a sawtooth pattern.

Returning to the example of FIGS. 7A, 7B and 7C, the odd numbered lines are perfectly aligned horizontally as are the even numbered lines, but the even and odd lines are not aligned to each other. The even numbered lines are recessed horizontally with respect to the odd numbered lines. Thus, subtracting line n−(n+2) yields no difference and subtracting line n−(n+1) does yield a difference. In this case, each of lines 3 through 5 satisfies the basic criteria and a correction is produced for each along the portions of the scanning lines in which the corresponding pixels differ in amplitude. Thus, in the output video, the correction pulse "CORR 2," etc.) causes the correction mechanism to substitute grey or fuzzy line information for the corresponding black and white information in lines 2–5. This is shown in FIG. 7C as a dotted line.

FIGS. 8A, 8B and 8C illustrate an offset horizontal transition, which is not a sawtooth, but a commonly occurring shape. It is useful to see how the sawtooth detection criteria operate upon such a pattern. The subtractions of line 1-3 and line 1-2 both yield no difference, so nothing is corrected. The subtraction of line 2-4 yields a difference, but the subtraction of line 2-3 is zero, therefore the pattern is not a sawtooth. The subtractions of line 3-5 and line 3-4 both show a difference and once again do not meet the requirements for a sawtooth so nothing is corrected. The output video of FIG. 8C is the same as the input video of FIG. 8A. Thus, as shown by this example, the sawtooth detection criteria does not respond to an offset horizontal transition.

The third example, illustrated in FIGS. 9A, 9B and 9C is of a diagonal sawtooth. Here the odd numbered lines form a diagonal transition as do the even numbered lines, but the even lines do not lie directly under the odd lines as would be the case for a diagonal transition correctly reproduced by a line doubling interlaced to progressive scan converter. Line 1-3 yields a difference in pixel amplitudes along the horizontal scanning line length under segment II, and line 1-2 exhibits a difference under segment III. Therefore in segment III, correction will occur. Line 2-4 shows a difference in segment III while line 2-3 tells of a difference in both segment II and segment III. Therefore, correction will only occur in segment II. The correction for lines 4 and 5 are the same as the cases for lines 2 and 3, respectively, but advanced by one segment.

The last example, shown in FIGS. 10A, 10B and 10C, is a proper diagonal transition. In this case, for every line the n-(n+2) subtraction yields a difference. The line n-(n+1) subtractions either show no difference, as in the cases of line 1-2 and line 3-4, or a difference at the same place as the two line subtraction as in the cases of line 2-3 and line 4-5. Hence, in every case there is never a one line difference when there is not a two line difference, so no sawtooth is detected.

Thus, the preferred sawtooth detection logic will detect only sawtooth type patterns and will not affect normal Nyquist criteria obeying signals in which sawtooth patterns are not possible.

Preferably, correction is provided by fading (i.e., gradually switching) horizontally between a vertically filtered signal and an unaltered signal. A direct switching between the unaltered and filtered signals is not desired because it produces an unpleasing picture. As mentioned above, both the sawtooth correction and the motion signals are expanded horizontally and vertically in order to assure that all of each sawtooth pattern is suppressed. Because the correction process has such a benign effect on the reproduced television picture, there is essentially no penalty in expanding the physical picture area and time of the correction, whereas the vestigial remains of an incompletely removed sawtooth artifact is likely to be visibly noticeable.

Two more specific embodiments in the manner of the embodiment of FIG. 3 will now be described.

FIG. 11 shows a functional block diagram of the sawtooth detector 12 of FIG. 3. The input, shown as "Y DBL" (line doubled luminance), is the line doubled progressive scan luminance output of converter 10. As mentioned above, the details of converter 10 are set forth in said U.S. Pat. No. 4,982,280. The Y DBL input is applied to series connected one horizontal scan line (1H) memories 40 and 42. A first subtractive combiner 44, weighting each input ½, receives the current line, line 0, and the 1H delayed line, line 1, to provide at its output line 0—line 1, which is applied to a full-wave rectifier 46, thereby converting the difference to an absolute value. In a similar manner, a second subtractive combiner 48, weighting each input ½, receives the current line, line 0, and the 2H delayed line, line 2, to provide at its output line 0—line 2, which is applied to a full-wave rectifier 50, thereby converting the difference to an absolute value.

After rectification, a threshold T1 is applied in block 52 to the |line 0–line 1| signal to define a minimum point at which a difference in pixel amplitudes is noticed. Below the threshold the output of block 52 is zero. Above the threshold, the output of block 52 is the actual pixel amplitude difference. The threshold is chosen to be above noise but low enough to detect visible artifacts. Next, in block 54, the pixel amplitude difference is summed over a pre-defined length along the horizontal scan lines of lines 0 and 1 in order to further filter out noise and to desensitize the detector to non-sawtooth artifacts by imposing a minimum length. In a preferred embodiment, 4 horizontal pixels has been found a satisfactory length. If the sum determined in block 54 exceeds a threshold T2, the sum is applied to block 56, otherwise the output of block 54 is zero. Threshold T2 is also chosen to be above noise but low enough to detect visible artifacts. Then, in block 56, the pixel amplitude is summed for each horizontal pixel position over three horizontal scan lines (i.e., over a three vertical pixel height) in order to more precisely determine a sawtooth pattern by imposing a minimum number of occurrences. A threshold T3 is applied to the function of block 56 for the same purpose as thresholds T1 and T2.

In a practical embodiment of the arrangement of FIG. 11, blocks 52 and 58 each output a multibit binary coded signal, each of blocks 54, 56, 6 and 62 output a one bit signal and the logic function is provided by AND gate 64 which operates on its four one-bit inputs. Although this arrangement is not critical, it provides satisfactory results at low cost. Alternatively, a more complex sawtooth logic arrangement may be provided using multi-bit signals throughout.

In a parallel path the output of full-wave rectifier 50, |line 0–line 2|, is processed. In a similar way as in the other path, the rectifier output is applied to a first threshold function 58 having a threshold T4, to a second threshold function 60 which sums over a four horizontal pixel length and subjects the sum to a threshold T5, and to a third threshold function 62 which sums over a two vertical pixel height and subjects the sum to a threshold T6. The thresholds for the two paths are different. The two line difference path is set to be very sensitive to change because the arrangement is looking for the two lines to be very close to each other. The one line difference path need not be so sensitive. Also, the vertical pixel height looked at in the two paths is different because there are three 1H subtractions in the same number of lines that there are two 2H subtractions.

The outputs of blocks 56 and 62 are one bit signals, indicating, respectively, if |line 0–line 1|<>0 and if |line 0–line 2|≈0. The processed 1H difference signal from block 56 and the inverted processed 2H difference signal from block 62 (through a NOT input of AND gate 64) are combined with a motion yes/no signal and a film yes/no signal in AND gate 64 such that when there is a thresholded 1H difference but no thresholded 2H difference in a moving area of film, then current pixel position is considered to be in a sawtooth pattern and a sawtooth yes/no pulse produced by AND gate 64 changes to its "yes" state. The film yes/no signal is provided by the line doubler described in said U.S. Pat. No. 4,982,280.

The motion yes/no signal is different from the motion yes/no signal provided in the arrangement described in said U.S. Pat. No. 4,982,280. For the purposes of the present invention, the motion yes/no signal changes on a pixel by pixel basis and is derived from a general motion signal which is line doubled in the same manner as a video pixel and converted into a yes/no signal. The motion signal is expanded horizontally and vertically either before or after line doubling. A general motion signal is generated by subtracting, on a pixel by pixel basis, the amplitude of pixels in fields spaced one frame apart in the input interlaced television signal. The difference signal is low pass filtered, thresholded to suppress noise and rectified. The derivation of a general motion signal in such a manner is set forth in relevant ones of said cited U.S. Patents. The motion signal is horizontally and vertically expanded by several horizontal and vertical pixel positions, say two or three, both left and right and up and down.

The portion 66 of the arrangement of FIG. 11 within the dashed lines may be designated "sawtooth logic."

FIG. 12 shows a functional block diagram of an alternate embodiment of the sawtooth detector 12 of FIG. 3. This variation implements the aforementioned equation |line n–line (n–1)|≈|line n–line (n+1)|<>0. The input, shown as "Y DBL" (line doubled luminance), is the line doubled progressive scan luminance output of converter 10. As mentioned above, the details of converter 10 are set forth in said U.S. Pat. No. 4,982,280. The Y DBL input is applied to series connected one horizontal scan line (1H) memories 40 and 42. A first subtractive combiner 44, weighting each input ½, receives the current line, line 0, and the 1H delayed line, line 1, to provide at its output line 0–line 1, which is applied to a full-wave rectifier 46, thereby converting the difference to an absolute value. In a similar manner, a second subtractive combiner 48, weighting each input ½, receives the 1H delayed line, line 1, and the 2H delayed line, line 2, to provide at its output line 0–line 2, which is applied to a full-wave rectifier 50, thereby converting the difference to an absolute value. After rectification, a threshold T7 is applied in block 68 to the |line 0–line 1| signal to define a minimum point at which a difference in pixel amplitudes is noticed. Below the threshold the output of block 68 is zero. Above the threshold, the output of block 68 is the actual pixel amplitude difference. The threshold is chosen to be above noise but low enough to detect visible artifacts. In a similar way, in the parallel path, following rectifier 50, a threshold T8 is applied in block 70 to the |line 1–line 2| signal. Thresholds T7 and T8 may be the same in this embodiment. The outputs of the thresholding blocks 68 and 70 are applied to block 72 which applies a function that determines if the difference between these two values is less than a predefined value, and that they are not 0. If this difference is less than the predefined value, threshold T9, then a sawtooth is considered to be occurring and the output of block 72 controls a single-pole double throw switch 74 so that one of the difference signals, arbitrarily chosen to be |line 1–line 2|, is applied to blocks 76 and 78. Otherwise, the switch 74 grounds the input to block 76.

Blocks 76 and 78 operate in the same manner as blocks 54 and 56, respectively. In block 76, the pixel amplitude difference is summed over a pre-defined length along the horizontal scan lines of lines 0 and 1 in order to further filter out noise and to desensitize the detector to non-sawtooth artifacts by imposing a minimum length. In a preferred embodiment, 4 horizontal pixels has been found a satisfactory length. If the sum determined in block 76 exceeds a threshold T10, the sum is applied to block 78, otherwise the output of block 76 is zero. Threshold T10 is also chosen to be above noise but low enough to detect visible artifacts.

Then, in block 78, the pixel amplitude is summed for each horizontal pixel position over three horizontal scan lines (i.e., over a three vertical pixel height) in order to more precisely determine a sawtooth pattern by imposing a minimum number of occurrences. A threshold T11 is applied to the function of block 78 for the same purpose as thresholds T10.

The signal from block 78, which is either zero if switch 74 is grounded or is the processed |line 1–line 2| signal, are combined with a motion yes/no signal and a film yes/no signal in AND gate 80 such that when the |line 1–line 2| signal is selected by switch 74 and exceeds the thresholds for a moving area of film, then the current pixel position is considered to be in a sawtooth pattern and a sawtooth yes/no pulse from AND gate 80 changes to its "yes" state. The film yes/no signal is provided by the line doubler described in said U.S. Pat. No. 4,982,280. The motion yes/no signal is derived in the same manner as in the arrangement of FIG. 11. The portion 82 of the arrangement of FIG. 12 within the dashed lines may be designated "sawtooth logic."

The preferred arrangement of the control circuit functions is that of the embodiment of FIG. 11.

FIG. 13 is a functional block diagram showing not only the control circuit functions but also the video path functions, namely the one-line delay and sawtooth detection arrangement of FIG. 11 in combination with a 3-pole filter for vertical averaging. A similar arrangement may be implemented to incorporate the arrangement of FIG. 12.

Referring to FIG. 13, the input, shown as "Y DBL" (line doubled luminance), is the line doubled progressive scan luminance output of converter 10 of FIG. 3. As mentioned above, the details of converter 10 are set forth in said U.S. Pat. No. 4,982,280. The Y DBL input is applied to series connected one horizontal scan line (1H) memories 40 and 42. A first subtractive combiner 44, weighting each input ½, receives the current line, line 0, and the 1H delayed line, line 1, to provide at its output line 0–line 1, which is applied to sawtooth logic 66 (shown in FIG. 11). In a similar manner, a second subtractive combiner 48, weighting each input ½, receives the current line, line 0, and the 2H delayed line, line 2, to provide at its output line 0–line 2, which is also applied to sawtooth logic 66. The sawtooth logic 66 also receives the motion signal and film yes/no signal as explained in connection with FIG. 11. Alternatively, the sawtooth logic 82 may be employed, provided that the configuration of the one line delays 40 and 42 and the subtractive combiners 44 and 48 is modified in the manner of FIG. 12.

The "sawtooth yes/no" signal output from sawtooth logic 66 is applied to a horizontal and vertical expander 83 and then to a control signal shaper 84. The sawtooth signal is horizontally and vertically expanded in expander 83 by several horizontal and vertical pixel positions, say two or three, both left and right and up and down.

As mentioned above, when a sawtooth pattern is detected, the uncorrected signal in the sawtooth region of a scan line preferably is faded to a vertically filtered or averaged signal and then faded back to the uncorrected signal outside the sawtooth artifact region. The correction is provided by fading (i.e., gradually switching) horizontally between a vertically filtered signal and an unaltered signal. A direct switching between the unaltered and filtered signals is not desired because it produces an unpleasing picture. The control signal shaper 84 provides the fading effect. It receives a one-bit signal from the sawtooth logic and converts it into a stair-step up and stair-step down signal, simulating a multi-bit signal. The signal steps up from zero to its full value over the period of two to three pixels, it remains at its maximum value as long as the one-bit signal from logic 66 is high. When the logic signal falls to zero, the output out of shaper 84 steps back down to zero over the period of two to three pixels. The effect is similar to providing a gentle rise time and a gentle fall time for a smooth analog signal. Although other implementations are possible, this approach has the advantage of achieving the desired results at very low cost. The shaper 84 in cooperation with the horizontal and vertical expander 83 starts to step up the sawtooth correction signal before the occurrence of the delayed sawtooth artifact (as delayed by the delay match in the video path) such that the sawtooth correction signal is at its full value substantially during the time of the sawtooth artifact. The shaper 84 and expander 83 then cooperate to step the sawtooth correction signal back down to its no correction value following the sawtooth artifact.

The video path is from the Y DBL input through the series one-line delays 40 and 42 to the delay match 86. Delay match 86 delays the video appropriately to match the sawtooth correction signal from control signal shaper 84. This delayed video signal is then applied to two further one-line delays 88 and 90. The outputs of each of the two-line delays and the delay matching block are weighted and applied to an additive combiner 92 to form an averaged signal. The weightings are not critical—in a practical embodiment the output of delay match is weighted ¼, the output of the first 1H delay 88 is weighted ½, and the output of the second 1H delay 90 is weighted ¼. Although these weightings provide a gaussian response and empirically provide a good result, other weightings may be used.

The output of combiner is applied to one end of a potentiometer 94, which functions as a fader under the control of the shaped control signal from block 84. The other end of potentiometer 94 receives an unaveraged video signal from the output of the first 1H delay 88. In that way, the three-line averaged video signal from combiner 92 has the same timing as the unaveraged video signal from the output of 1H delay 88. The output of the controlled fader, the wiper of potentiometer, which is controlled by the signal from shaper 84, is the corrected output signal Y DBL CORRECTED, in which sawtooth artifacts are suppressed.

Although a three-pole filter arrangement such as in the embodiment of FIG. 13 is workable, a preferred arrangement is to use a five-pole filter because it provides an improved picture because of its faster rise time. Such an alternative is shown in the functional block diagram of FIG. 14. As is the case with the embodiment of FIG. 13, it is preferred that the arrangement employs the sawtooth logic 66 of FIG. 11, although the sawtooth logic of FIG. 12 may be used if the configuration of the one line delays 40 and 42 and the subtractive combiners 44 and 48 is modified in the manner of FIG. 12.

The arrangement of FIG. 13 differs from FIG. 12 in that the video path output from the second 1H delay 42 is applied to three series one-line delays 94, 96 and 98, the outputs of which are applied to weighted inputs of an additive combiner 100. Thus, there are five one-line delays in series. Also different from the FIG. 12 arrangement is that the outputs of the initial one-line delays 40 and 42 are also applied to weighted inputs of combiner 100. The weightings of the various one line delay outputs, constituting coefficients of the resulting five-pole filter, are as follows:

one-line delay 40 −⅛,
one-line delay 42 ¼,
one-line delay 94 ¾,
one-line delay 96 ¼, and
one-line delay 98 −⅛.

The weightings are not critical. The weightings of the above example were chosen empirically and they provide acceptable preshoot and overshoot.

The unaveraged output is taken from the output of one-line delay 94 and applied to a delay match 102. The output of the five-pole filter from combiner 100 is applied to another delay match 104. Delay match 102 and 104 assure that the unaveraged and filtered video signal are in time with each other and with the correction pulse from expander 83 and shaper 84. The outputs of the delay matches 102 and 104 are applied to respective ends of potentiometer 94, which functions as a fader under the control of the shaped control signal from block 84 in the same way it functions in the arrangement of FIG. 13. The output of the controlled fader, the wiper of potentiometer, which is controlled by the signal from shaper 84, is the corrected output signal Y DBL CORRECTED, in which sawtooth artifacts are suppressed.

Although other filter combinations may be used to provide averaging, a five-pole filter is preferred because it provides a good compromise between picture improvement and increased cost.

The arrangements of FIGS. 11, 12, 13 and 14 may be adapted to implement the arrangement of FIG. 2 by omitting the FILM Y/N and MOTION inputs. Furthermore, the arrangements of FIGS. 13 and 14 may be adapted to implement the arrangement of FIG. 1 by omitting the sawtooth logic blocks (66 or 82), the control signal shaper 84 and the fader 92. Thus, the output would be a continuous corrected output taken from the filter output, the output of combiner 92 in FIG. 13 and the output of combiner 100 in FIG. 14. In the case of the FIG. 6 arrangement, the output of the compression detector 28, which may be shaped in the manner of the control signal output of shaper 84 (FIGS. 13 and 14), would control the fader 92 in the FIG. 13 and 14 arrangements, rather than the output of shaper 84. As a further alternative, the compression detector of FIG. 6 may be provided in addition to the control signal functions responding to sawtooth artifacts or to sawtooth artifacts in combination with motion in a film source.

The present invention may be implemented using analog, digital, hybrid analog/digital and/or digital signal processing in which functions are performed in software.

We claim:

1. Apparatus for processing a video signal, comprising means for converting an interlaced video signal to a progressively scanned video signal, wherein said progressively scanned video signal exhibits artifacts in the form of jagged vertical or diagonal transitions, and means for vertically averaging the progressively scanned video signal picture at least in the region or regions of the picture in which said artifacts are present, said means for vertically averaging including means for detecting said artifacts by determining if there are differences among pixels in more than one set of three adjacent scan lines of the progressively scanned video signal, said means for determining if there are differences including means for deriving differences among pixels in adjacent sets of lines according to the relationships:

|line n−line (n+2)|≈0, and
|line n−line (n+1)|<>0.

2. Apparatus for processing a video signal, comprising means for converting an interlaced video signal to a progressively scanned video signal, wherein said progressively scanned video signal exhibits artifacts in the form of jagged vertical or diagonal transitions, and means for vertically averaging the progressively scanned video signal picture at least in the region or regions of the picture in which said artifacts are present, said means for vertically averaging including means for detecting said artifacts by determining if there are differences among pixels in more than one set of three adjacent scan lines of the progressively scanned video signal, said means for determining if there are differences including means for deriving differences among pixels in adjacent sets of lines according to the relationships:

|line n–line (n–1)|≈|line n–line (n+1)|<>0.

3. Apparatus according to claim 1 wherein said means for converting includes means for merging fields of said interlaced video signal.

4. Apparatus according to claim 2 wherein said means for converting includes means for merging fields of said interlaced video signal.

5. Apparatus according to any one of claims 1, 2, 3 or 4 in which said means for converting includes means for detecting relative motion between video fields applied to said means for converting, wherein said means for vertically averaging is controlled to provide averaging in response to said artifacts only when said means for converting detects motion.

6. Apparatus according to any one of claims 1, 2, 3 or 4 in which said means for converting includes means for detecting that the video signal is derived from a motion picture film and means for detecting relative motion between video fields applied to said means for converting, wherein said means for vertically averaging is controlled to provide averaging in response to said artifacts only when said means for converting detects that the video is derived from a motion picture and detects motion.

7. Apparatus according to claim 1 or claim 2 further comprising means for data compressing the vertically averaged progressively scanned video signal.

8. Apparatus according to claim 1 or claim 2 further comprising means for standards converting the vertically averaged progressively scanned video signal.

9. Apparatus according to claim 1 or 2 wherein said interlaced video signal has been subject to data compression.

10. Apparatus according to claim 9 further comprising means for detecting that the interlaced video signal has been subject to data compression, said means for detecting controlling said means for vertically averaging to continuously provide vertical averaging of the entire progressively scanned video signal in response to the detection of a video signal subjected to data compression.

11. Apparatus according to any one of claims 1, 2, 3 or 4 wherein said means for detecting artifacts determines if the sum of the differences over several horizontal pixel positions exceeds a threshold.

12. Apparatus according to any one of claims 1, 2, 3 or 4 wherein said means for detecting artifacts determines if the sum of the differences over several vertical pixel positions exceeds a threshold.

13. Apparatus for processing a progressively scanned video signal that has been converted from an interlaced video signal, comprising means for detecting artifacts in said progressively scanned video signal, wherein said artifacts are in the form of jagged vertical or diagonal transitions, and means for vertically averaging the progressively scanned video signal in the region or regions of the picture in which said artifacts are detected, said means for vertically averaging including means for detecting artifacts in the form of jagged vertical or diagonal transitions by determining if there are differences among pixels in more than one set of three adjacent scan lines of the progressively scanned video signal, said means for determining if there are differences including means for deriving differences among pixels in adjacent sets of lines according to the relationships:

|line n–line (n+2)|≈0, and

|line n–line (n+1)|<>0.

14. Apparatus for processing a progressively scanned video signal that has been converted from an interlaced video signal, comprising means for detecting artifacts in said progressively scanned video signal, wherein said artifacts are in the form of jagged vertical or diagonal transitions, and means for vertically averaging the progressively scanned video signal picture in the region or regions of the picture in which said artifacts are detected, said means for vertically averaging including means for detecting artifacts in the form of jagged vertical or diagonal transitions by determining if there are differences among pixels in more than one set of three adjacent scan lines of the progressively scanned video signal, said means for determining if there are differences including means for deriving differences among pixels in adjacent sets of lines according to the relationships:

|line n–line (n–1)|≈|line n–line(n+1)|<>0.

15. Apparatus according to claim 13 or claim 14 wherein said apparatus receives a motion signal indicating motion in said interlaced video signal and said means for vertically averaging is controlled to provide averaging in response to said artifacts only when said motion signal indicates motion in said interlaced video signal.

16. Apparatus according to claim 13 or claim 14 wherein said apparatus receives a motion signal indicating motion in said interlaced video signal and a film signal indicating that the interlaced video signal is derived from a motion picture film, and said means for vertically averaging is controlled to provide averaging in response to said artifacts only when said motion signal indicates motion in said interlaced video signal and when said film signal indicates that the interlaced video signal is derived from a motion picture film.

17. Apparatus according to claim 13 or claim 14 further comprising means for data compressing the vertically averaged progressively scanned video signal.

18. Apparatus according to claim 13 or claim 14 further comprising means for standards converting the vertically averaged progressively scanned video signal.

19. Apparatus according to claim 13 or claim 14 wherein said interlaced video signal has been subject to data compression.

20. Apparatus according to claim 13 or claim 14 wherein said means for detecting artifacts determines if the sum of the differences over several horizontal pixel positions exceeds a threshold.

21. Apparatus according to claim 13 or claim 14 wherein said means for detecting artifacts determines if the sum of the differences over several vertical pixel positions exceeds a threshold.

* * * * *